2,958,647

CRACKING CATALYST

Alfred E. Hirschler, Springfield, Pa., assignor to Sun Oil Company, Philadelphia, Pa., a corporation of New Jersey No Drawing. Filed Apr. 11, 1958, Ser. No. 727,798

8 Claims. (Cl. 208—119)

This invention relates to a method of preparing cracking catalysts which are highly resistant to attrition and to the catalyst so-produced.

The use of siliceous catalysts for cracking hydrocarbons is well known. Such catalysts may be used in cracking processes such as fixed bed, moving bed or fluidized bed operations. In moving bed and fluidized bed operations, during the cracking step, the catalyst generally moves in a downwardly direction under the influence of gravity while contacting hydrocarbons which may be in liquid or gas phase, or in both liquid and gas phase. After passing through the cracking zone, the catalyst is regenerated as by burning off carbon deposits and is then elevated, or lifted, so that it may again descend through the cracking zone. In some instances deactivated catalyst particles are elevated to a regeneration zone located above the cracking zones. These lift operations may be mechanically performed, but gas lift operations wherein catalyst particles are blown upwardly by means of a high velocity gas stream have many advantages. For example, flue gas flowing through a vertical conduit at high velocity can advantageously be used to elevate the catalyst particles.

In cracking operations as above described, wherein catalyst particles move through a cracking zone and are then elevated for another pass through the cracking zone, catalyst attrition is a serious problem. This attrition occurs in the cracking zone, in the regeneration zone, and especially during gas lift operations by the grinding action of the catalyst particles against each other and against the confining surfaces of the apparatus. Catalyst attrition in some instances may be so severe as to render a cracking process uneconomical.

An object of the present invention is to provide a cracking catalyst resistant toward attrition. A specific object is to provide a process for preparing a siliceous cracking catalyst which is highly resistant toward attrition. A further object is to provide a process for the preparation of novel siliceous cracking catalysts especially effective for cracking hydrocarbons, and to the cracking of hydrocarbons with the novel catalyst.

By "siliceous cracking catalyst," as used herein, is meant a catalyst containing a major proportion of silica and which is known to exhibit activity toward cracking hydrocarbons. Synthetic catalysts such as silica-alumina, silica-magnesia, silica-zirconia, silica-alumina-magnesia and silicavanadia catalysts, the preparation of which is well known, can be used in the present process with good results. Natural clays which may be acid activated such as fuller's earth, kaolin, the montmorillonite group including bentonite, and the like can also be used in the process of the invention. Particles of such siliceous catalysts, which may be in the form of pellets or granules of a size suitable for use in a moving bed or fluidized bed hydrocarbon cracking process, are used in the present invention.

It has now been found that by heating particles of a siliceous cracking catalyst with limestone, as hereinafter described, a discontinuous, glassy coating is formed on the exterior surface of the catalyst and the resulting particles strongly resist attrition.

Limestone which can be used in the present invention contains at least 50% calcium carbonate and at least 10% magnesium carbonate. Magnesian stone containing from about 10% to 30% magnesium carbonate and over 50% calcium carbonate gives good results, as does dolomitic stone which contains from about 30% to 45% magnesium carbonate and over 50% calcium carbonate. Dolomitic limestone composed of the double carbonate of calcium and magnesium gives excellent results in the process. Various impurities such as alumina combined with silica as clay, alumina silicates and iron compounds can be present in minor amounts without causing deleterious results. Use of the principal components of limestone, calcium carbonate and magnesium carbonate, even in intimate admixture does not appear to give equivalent results. This is believed due to the fact that, with a physical admixture, both of the carbonates are not necessarily in contact with the same area of the siliceous cracking catalyst so that a glassy surface comparable to that obtained with limestone is not obtained.

In order to prepare the catalyst particles of the invention, a minor proportion of comminuted limestone is heated in contact with particles such as pellets of a siliceous cracking catalyst to a temperature sufficient to cause an interaction between the components of the limestone and components of the cracking catalyst so that glazed areas are formed on portions of the exterior surface of the cracking catalyst. The particle size of the comminuted limestone is preferably below about 100 mesh (U.S. sieve series). The glaze is a glass or glass-like film apparently formed by fusion of the limestone components with the components of the siliceous catalyst such as silica and/or alumina. Formation of the glaze is substantially on the exterior surface of the catalyst pellet. The quantity of limestone used must be such that only a discontinuous glaze is obtained on the pellets so that catalytic activity is not lost. From about 10% to 60%, and preferably from about 20% to 50%, of the total exterior surface area of the pellets is coated with the glassy film.

Advantageously the catalyst preparation is performed continuously while operating a process for cracking hydrocarbons. In this embodiment of the invention, comminuted limestone is advantageously introduced into the cracking process as a slurry in the hydrocarbon feed. The addition may be continuous or intermittent. Only a small amount of limestone, from about 0.2 to 1 pound per ton of catalyst per day, is used. While the mechanism of the formation of the glassy discontinuous surface is not known with certainty, it is believed to be formed in the catalyst regeneration step wherein relatively high temperatures are obtained on localized areas of the catalyst particles during the burning of carbon therefrom. It is known, however, that by introducing limestone with the hydrocarbon feed and carrying out the cracking cycle, after cracking and subjecting the catalyst particles to regeneration including the burning of carbon therefrom, the regenerated catalyst particles exhibit a glaze on a portion of the surface thereof. It is also known that this glaze substantially reduces attrition of the catalyst particles without decreasing the catalytic activity thereof.

In another embodiment of the invention, the catalyst particles having a glassy discontinuous surface are prepared prior to use in a cracking operation. This is accomplished by admixing catalyst pellets with minor quantities of the comminuted limestone and heating the resulting admixture, preferably with agitation, to a temperature sufficient to form the glaze, usually a temperature of from about 600° C. to 1000° C., or higher. When relatively high temperatures are employed, it is preferred to operate so that the entire catalyst is not heated to such a high temperature. For example, dropping a pellet partially coated with limestone through a suitable furnace can be used with good results. The resulting catalyst particles containing the discontinuous glassy surface are then used in cracking processes.

As above described, the catalysts of the invention are especially effective for cracking hydrocarbons in processes wherein catalyst attrition is normally observed such as in moving bed and fluidized bed operations. Cracking conditions heretofore described are used such as temperatures of from about 400° C. to 550° C. and pressures of from atmospheric to 50 p.s.i. (pounds per square inch).

In accordance with the present invention, the loss of catalyst such as to catalyst fines is reduced at least 20% and such loss may be reduced by 50% or more. It is a further characteristic of the process of the invention that cracking activity of the catalyst is not appreciably decreased by the discontinuous glassy surface formed in accordance with the invention. Apparently by coating less than 50% of the catalyst particles, sufficient surface area remains so that a reduction in catalytic activity is not observed.

The following examples illustrate the present invention:

*Example 1*

Granules of a synthetic silica-alumina cracking catalyst containing about 87% silica and 13% alumina, and having an activity index of about 46 were contacted with comminuted limestone of about 100 mesh, the quantity of limestone being sufficient to contact only portions of the surface of the catalyst granules. "Activity index," as used herein, is a measure of the efficacy of catalyst for cracking hydrocarbons and is determined by a method described by Alexander, Proceedings Am. Pet. Inst. 27 (III) 51 (November 1947). The limestone contained above about 51% calcium carbonate and above about 41% magnesium carbonate. The admixture was rapidly heated, to a temperature sufficient to cause interaction, which was above about 900° C., for from about 1 to 2 minutes. On examination, the catalyst granules contained glassy areas over less than about 50% of the exterior surface of the granules. The resulting particles, when used in a fluidized bed catalyst cracking process for converting hydrocarbons boiling in the range of from about 200° C. to 350° C. to gasoline hydrocarbons, exhibits undiminished cracking activity, and attrition of the catalyst particles as measured by loss of catalyst to catalyst fines is decreased about 40%.

*Example 2*

Pellets of the same cracking catalyst used in Example 1 were contacted with comminuted limestone also as described in Example 1, the quantity of limestone used being sufficient to contact only portions of the surface of the catalyst particles. The admixture was heated to about 900° C. for about 2 minutes. The resulting catalyst particles contained glassy areas over portions of the exterior surface and less than 50% of the exterior surface being covered. When used in a moving bed catalytic cracking process, wherein hydrocarbons are converted to lower molecular weight hydrocarbons under cracking conditions, the cracking activity of the catalyst pellets is essentially the same as the pellets without the discontinuous glaze, but attrition of the catalyst pellets containing the glaze is reduced about 35% as compared to the attrition of pellets not having such glaze.

The invention claimed is:

1. Method for rendering cracking catalyst more resistant to attrition while employing the catalyst in the cracking of hydrocarbon oil, with subsequent regeneration of the catalyst by burning carbon deposits therefrom, which comprises contacting granular solid cracking catalyst selected from the group consisting of synthetic silica-alumina, silica-magnesia, silica-zirconia, silica-alumina-magnesia and silica-vanadia cracking catalyst and activated clay cracking catalyst with a slurry of comminuted limestone containing at least 50% calcium carbonate and at least 10% magnesium carbonate in hydrocarbon oil at a temperature in the range from 400 to 550° C. in a cracking zone to produce gasoline, the amount of limestone being in the range from 0.2 to 1 pound per ton of catalyst per day, and subsequently burning carbon deposits from the catalyst particles in a regenerating zone to obtain regenerated catalyst particles having a glaze on 10 to 60% of the total exterior surface area of the particles.

2. Process for the preparation of cracking catalyst which comprises heating a physical mixture of discrete granular cracking catalyst selected from the group consisting of synthetic silica-magnesia, silica-zirconia, silica-alumina-magnesia and silica-vanadia cracking catalyst, and activated clay cracking catalyst, and discrete granular particles of comminuted limestone containing at least 50% calcium carbonate and at least 10% magnesium carbonate, at a temperature in the range from 600 to 1000° C., and reacting components of said limestone with components at the periphery of the particles of said cracking catalyst, to form a glaze on 10 to 60 percent of the external surface of the cracking catalyst particles, thereby to obtain catalyst which is more resistant to attrition than the original catalyst and which has cracking activity not appreciably decreased from that of the original catalyst.

3. Process acording to claim 2 wherein said cracking catalyst is a silica-alumina catalyst.

4. Process according to claim 2 wherein said cracking catalyst is a silica-magnesia catalyst.

5. Process according to claim 2 wherein said cracking catalyst is a silica-zirconia catalyst.

6. Process according to claim 2 wherein said cracking catalyst is a silica-alumina-magnesia catalyst.

7. Process according to claim 2 wherein said cracking catalyst is a clay.

8. A new catalyst effective for cracking hydrocarbons which consists of particles of a siliceous cracking catalyst selected from the group consisting of synthetic silica-alumina, silica-magnesia, silica-zirconia, silica-alumina-magnesia and silica-vanadia cracking catalyst, and activated clay cracking catalyst, having a discontinuous glaze on from about 10% to 60% of the external surface thereof, said glaze having been formed by heating a physical mixture of discrete granular particles of the siliceous cracking catalyst with discrete granular particles of limestone containing at least 50% calcium carbonate and at least 10% magnesium carbonate.

References Cited in the file of this patent

UNITED STATES PATENTS

| | | |
|---|---|---|
| 1,574,380 | Endres | Feb. 23, 1926 |
| 1,800,881 | Andrus et al. | Apr. 14, 1931 |
| 1,874,743 | Harnsberger | Aug. 30, 1932 |
| 1,967,636 | Towne | July 24, 1934 |
| 2,278,590 | Ruthruff | Apr. 7, 1942 |
| 2,602,019 | Odell | July 1, 1952 |
| 2,861,945 | Kearby et al. | Nov. 25, 1958 |